3,210,359
BIS-CARBOXYPIPERIDIDES
Francis E. Cislak and Frank A. Karnatz, Indianapolis, Ind., assignors to Reilly Tar & Chemical Corporation, Indianapolis, Ind., a corporation of Indiana
No Drawing. Filed Oct. 19, 1964, Ser. No. 404,916
6 Claims. (Cl. 260—294)

This application is a continuation-in-part of Serial No. 194,685, filed May 14, 1962, now abandoned.

Our invention relates to new compositions of matter and to the process of making them. More particularly, it relates to bis-carboxypiperidides having the formula,

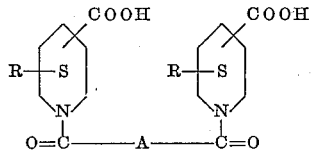

where R represents hydrogen, lower alkyl, or carboxy; and A represents alkylene, alkenylene (such, for example, as the maleic acid radical, the citraconic acid radical, the glutaconic acid radical, or the like), or arylene.

Our bis-carboxypiperidides are useful in making polyesters by interaction with polyhydric alcohols. With polyamines, they form polyamides; thus, adipyl-bis-(4,4'-carboxypiperidide) reacts with hexamethylene diamine to give a nylon type of polymer whose formula may be represented by:

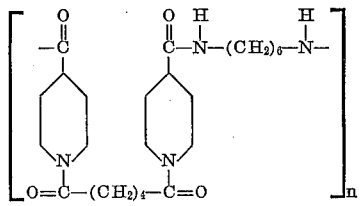

Our bis-carboxypiperidides with alkanols to give esters which are useful plasticizers.

Our bis-carboxypiperidides are useful in inhibiting the action of dilute sulfuric acid on steel. A 5% solution of our bis-carboxypiperidides in heavy coal tar bases is effective as an inhibitor in the pickling of steel with sulfuric acid and in acidizing oil-wells with hydrochloric acid.

In general, our bis-carboxypiperidides may be made by heating, at temperatures above about 100° C. and preferably above about 150° C., a piperidine-carboxylic acid with a dibasic acid, or a di-ester of a dibasic acid.

The following specific examples illustrate the manner in which our invention may be practiced. These examples are given by way of illustration only and are not to be construed as a limitation upon our invention.

EXAMPLE 1

*Adipyl-bis-(4,4'-carboxypiperidide)*

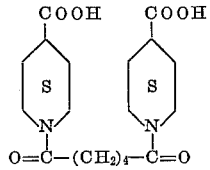

A mixture of 115 grams of isonipecotic acid, 83 grams of adipic acid, and 300 cc. of diethylbenzene is placed into a one liter flask. The flask is connected to a reflux condenser and a Dean-Stark water trap. The mixture is heated under reflux conditions (about 180° C.) and the water formed by the interaction of the adipic acid and the isonipecotic acid is collected in the water trap. When the theoretical amount of water (18 grams) is collected in the trap, the reaction is complete. The flask is allowed to cool, and the diethylbenzene is decanted from the adipyl-bis-(4,4'-carboxypiperidide) which was formed during the reaction. Any diethylbenzene remaining with the piperidide is removed by evaporation under vacuum. The hot molten piperidide is poured into a shallow pan and allowed to cool.

The adipyl-bis-(4,4'-carboxypiperidide) is soluble in water, methanol, and ethylene glycol. It is insoluble in aromatic or aliphatic hydrocarbons. It is hard at room temperature and softens above 100° C.

By the term "isonipecotic acid" we refer to piperidine-4-carboxylic acid, also known as hexahydroisonicotinic acid, having the formula,

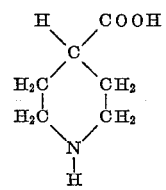

EXAMPLE 2

*Sebacyl-bis-(3,3'-carboxypiperidide)*

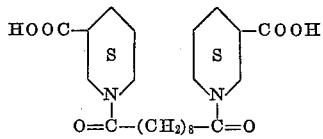

A mixture of 115 grams of nipecotic acid and 101 grams of sebacic acid (octane-1,8-dicarboxylic acid) are placed in a wide mouth flask. The mixture is heated gently (in an oil bath) with constant stirring. The temperature of the oil bath is raised gradually until the reaction mixture attains a temperature of about 170–180° C. The mixture is maintained at this temperature for about four hours; it is stirred constantly. Then the resulting sebacyl-bis-(3,3'-carboxypiperidide) is poured into a shallow pan and cooled.

By the term "nipecotic acid" we refer to piperidine-3-carboxylic acid, also known as hexahydronicotinic acid, having the formula,

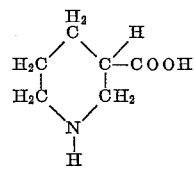

EXAMPLE 3

*Azelaic di-4-carboxypiperidide*

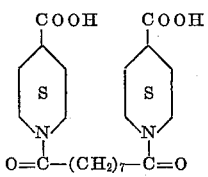

The procedure of Example 1 is repeated with the exception that 94 grams of azelaic acid (heptane-1,7-dicarboxylic acid) is used in place of the 83 grams of adipic acid.

EXAMPLE 4

*Glutaryl-bis-(2,2'-carboxypiperidide)*

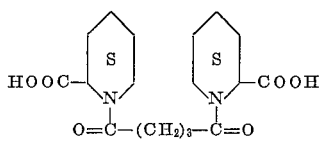

The procedure of Example 2 is repeated with the exception that 115 grams of pipecolinic acid is used in place of the nipecotic acid and 65 grams of glutaric acid is used in place of the 101 grams of sebacic acid.

By the term "pipecolinic acid" we refer to piperidine-2-carboxylic acid, also known as hexahydropicolinic acid and as pipecolic acid, having the formula:

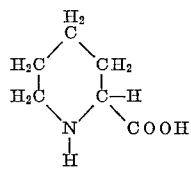

EXAMPLE 5

*Phthalyl-bis-(4,4'-carboxypiperidide)*

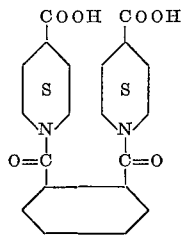

A mixture of 115 grams of isonipecotic acid and 92 grams of dimethylphthalate is placed in a wide mouth flask equipped with a mechanical stirrer. The flask is placed in an oil bath and while stirring, the temperature of the bath is gradually raised. As the reaction sets in, methanol is evolved. The temperature of the reaction is raised until it reaches about 180° C.–190° C. The reaction mixture is maintained at this temperature for about four hours. The phthalyl-bis-(4,4'-carboxypiperidide) formed is poured into a shallow pan and allowed to cool.

EXAMPLE 6

*Terephthalyl-bis-(4,4'-carboxypiperidide)*

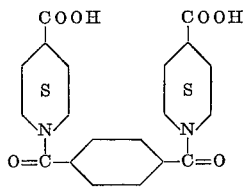

The procedure of Example 5 is repeated with the exception that the dimethyl ester of terephthalic acid is used in place of the dimethylphthalate.

EXAMPLE 7

*Naphthalene-2,6-dicarbox-bis-(4,4'-carboxypiperidide)*

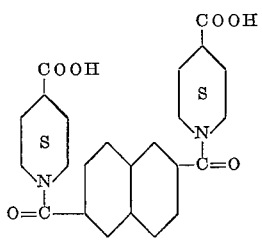

The procedure of Example 5 is repeated with the exception that 122 grams of the dimethyl ester of naphthalene-2,6-dicarboxylic acid is used in place of the 92 grams of dimethylphthalate.

EXAMPLE 8

*Adipyl-bis-(3,3',5,5'-dicarboxypiperidide)*

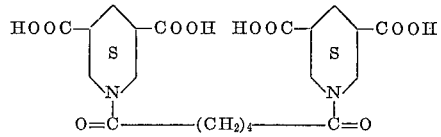

The procedure of Example 1 is repeated with the exception that 159 grams of 3,5-dicarboxypiperidine is used in place of the 115 grams of isonipecotic acid.

EXAMPLE 9

*Adipyl-bis-(3,3'-methyl-5,5'-carboxypiperidide)*

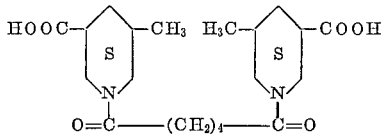

The procedure of Example 1 is repeated with the exception that 129 grams of 5-methylnipecotic acid is used in place of the 115 grams of isonipecotic acid.

EXAMPLE 10

*Maleic di-4-carboxypiperidide*

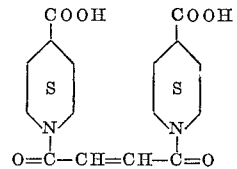

The procedure of Example 1 is repeated with the exception that 58 grams of maleic acid is used in place of the 83 grams of adipic acid.

EXAMPLE 11

*Decane-1,10-dicarbox-bis(4,4'-carboxypiperidide)*

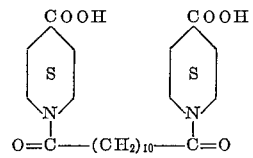

The procedure of Example 1 is repeated with the exception that we use 115 grams of dodecanedioic acid (decane-1,10-dicarboxylic acid) in place of the 83 grams of adipic acid.

EXAMPLE 12

*Glutaconic di-4-carboxypiperidide*

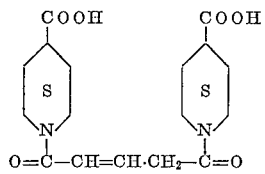

The procedure of Example 1 is repeated with the exception that 65 grams of gutaconic acid (propylene-1,3-dicarboxylic acid) is used in place of the 83 grams of adipic acid.

EXAMPLE 13

*Citraconic di-3-carboxypiperidide*

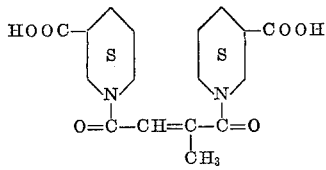

The procedure of Example 2 is repeated with the exception that 65 grams of citraconic acid is used in place of the 101 grams of sebacic acid.

Our bis-carboxypiperidides may be reacted with a diamine to form a polymeric compound. The reaction may be carried out by heating the bis-carboxypiperidide and the diamine above the melting point of the resulting polymer; the reaction is usually pushed to completion by removing the last traces of water under high vacuum. In some instances it is preferred to use as starting materials a diamine and an ester of the bis-carboxypiperidide. The polymeric compounds are of high melting point. The polymers are alkali insoluble. Their high melting points and their resistance to solvent action make them particularly useful in molding mechanical parts. The polymeric compounds formed by the interaction of our bis-carboxypiperidides are the subject matter of co-pending application Serial No. 194,687, filed May 14, 1962.

EXAMPLE 14

*Adipyl-bis-(3,3'-carboxypiperidide)*

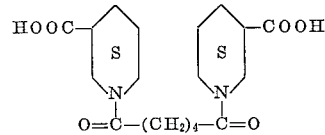

The procedure of Example 1 is repeated with the exception that nipecotic acid is used in place of the isonipecotic acid.

We claim as our invention:

1. A bis-carboxypiperidide of the formula:

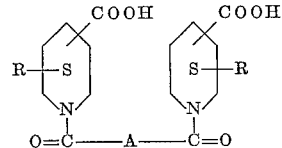

wherein R represents a member of the group consisting of hydrogen, lower alkyl, and carboxyl, and A represents a member of the class consisting of alkylene group having up to 10 carbon atoms and alkenylene group having from 2 to 3 carbon atoms.

2. Adipyl-bis-(4,4'-carboxypiperidide).
3. Adipyl-bis-(3,3'-carboxypiperidide).
4. Azelaoyl-di-4-carboxypiperidide.
5. Azelaoyl-di-3-carboxypiperidide.
6. Adipyl-bis-(2,2'-carboxypiperidide).

No references cited.

NICHOLAS S. RIZZO, *Primary Examiner.*